ent.

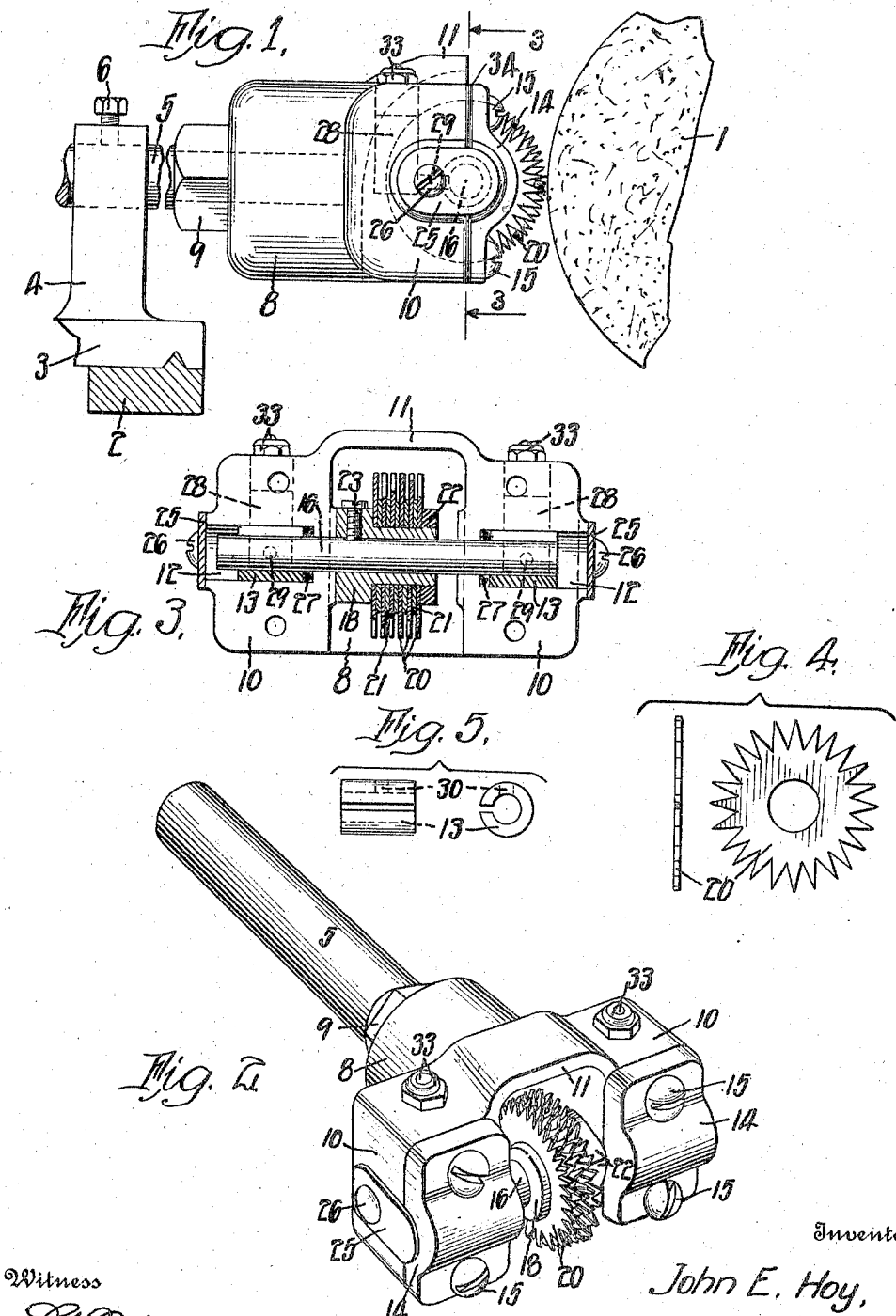

UNITED STATES PATENT OFFICE.

JOHN E. HOY, OF DETROIT, MICHIGAN.

GRINDING-WHEEL DRESSER.

1,249,758.

Specification of Letters Patent.

Patented Dec. 11, 1917.

Application filed May 21, 1917. Serial No. 169,890.

*To all whom it may concern:*

Be it known that I, JOHN E. HOY, a citizen of the United States, and residing at Detroit, in the county of Wayne and State of Michigan, have invented a new and Improved Grinding-Wheel Dresser, of which the following is a specification.

In the dressing of the worn surfaces of grinding tools it has been the custom to some extent to use a series of toothed disks clamped together and arranged to contact with the face of the grinding tool and be driven thereby. These devices have, however, been of substantially no value in the final dressing operation—that is, in the formation of a surface sufficiently exact for close work—since they had, in their movement across the face of the tool, a tendency to form a series of helical grooves therein.

To the end of overcoming the above mentioned objection and rendering the device suitable for use throughout the entire dressing of the tool, the present invention consists in a holder so arranged as to have relative bodily movement parallel to the axis of the rotating grinding tool, together with a series of disks mounted thereon in such manner as to be free to both rotate about and shift along a line parallel to the first mentioned axis independently of the relative bodily movement of the holder. It also consists in certain details of construction shown, described and claimed.

In the drawings, Figure 1 is a side view, parts being broken away, showing a preferred embodiment of the invention in working relation to the grinding tool. Fig. 2 is a perspective view of the device. Fig. 3 is a section on the line 3—3 of Fig. 1. Fig. 4 shows one of the disks both in side view and in elevation. Fig. 5 in like manner shows one of the bushings.

1 indicates the grinding tool or wheel of emery, carborundum or other suitable material, which is positively rotated rapidly about its axis by any suitable means. Adjacent the tool is a bed or track 2 along which the base 3 of a tool rest is movable back and forth by any preferred means; the tool rest includes the tool post 4 that is movable crosswise of the base by any mechanism, such, for example, as that usually employed for like purposes in lathes and similar machine tools. The upper end of the tool rest may be perforated to receive the handle 5 of the dressing tool and may have a clamping screw 6 for holding the latter rigidly in position.

The handle 5, in the embodiment shown, is threaded into the body 8 and is prevented from working loose by means of a lock-nut 9. At its front end the body is shaped to form two arms 10 connected at the top by a wall 11, and the front faces of the arms are bored out from the outside to form sockets 12 to receive the hardened slotted or split bushings or bearings 13 that are held in place by the caps 14 and screws 15. Rotatable in the bushings is a shaft 16 upon which a spool 18 (having thereon a series of toothed disks 20 and spacing washers 21 that are held in place by a nut 22) is secured by a set screw 23. The outer ends of the sockets 12 are normally closed by dust shields 25 that are swingable to and from closing position about the cap screws 26 whereby they are held in close sealing relation to the end walls of the sockets. It will be observed that the length of the spool is considerably less than the distance between the adjacent faces of the arms and that the distance between the dust shields is correspondingly greater than the length of the shaft 16; consequently the shaft and spool are free to shift back and forth along the axis of the shaft independently of the relative bodily movement of the tool and grinding wheel. This is of importance since it is found in practice that the spool continually oscillates back and forth, thus avoiding any tendency to form helical grooves in the wheel and establishing thereon a surface of substantially the same accuracy as that formed by the expensive diamond pointed tools in common use.

For the purpose of sealing the joint at the inner ends of the sockets 12, felt or other suitable washers 27 are employed; and, in order to secure a proper lubrication, the ears are cored or bored out to form oil pockets 28 from which the oil is conducted to the bearings through passages 29. The bushings are preferably provided with perforations 30 in alinement with the ends of the passages 29. Suitable oil valves 33 are threaded into the outer ends of the pockets 28.

As the speed of rotation of the spool is high, there are interposed between the caps 14 and the adjacent faces of the arms 10 a series of thin shims 34, preferably of metal, that may be successively removed to allow the split bushings to be compressed in accordance with the amount of wear which may have taken place. The slots in the bushings are preferably turned either up or down to allow the slight closing movement as the caps are tightened.

The operator is protected from flying sparks or chips by the wall 11.

The details of construction may be varied to a considerable extent without departing from the spirit of the invention, and the relative movement of the device across the face of the wheel may be secured by an actual movement of the latter instead of by a movement of the tool rest, as is obvious. I do not, therefore, wish to be limited except as indicated by the subjoined claims.

I claim:—

1. A device for dressing grinding wheels or the like comprising a divided member forming a support for a rotatable shaft, a shaft carried thereby, and a series of spaced toothed disks supported by and concentric with the shaft, said disks being free to shift as a whole longitudinally of the axis of the shaft, and under the influence only of their contact with a wheel upon which they may be working, an amount considerably greater than the width of a single disk.

2. A device for dressing grinding wheels or the like comprising a divided member forming a support for a rotatable shaft, a shaft carried thereby, a spool rigid with the shaft and interposed between the furcations of the divided member, and a series of spaced toothed disks concentric with the spool and non-rotatable in respect thereto, said disks, spool and shaft being free to shift as a whole longitudinally of the axis of the shaft an amount considerably greater than the width of a single disk.

3. A device for dressing grinding wheels comprising a body, and a spool supported by and rotatable in respect thereto, shaft means projecting from the spool at each end and received in the body, a series of spaced toothed disks concentric with the spool and rigid therewith, there being a clearance between the end of the spool and the body considerably greater than the width of a single disk whereby the spool is allowed limited free movement longitudinally of its own axis and in respect to the body, and under the influence only of their contact with a wheel upon which they may be working.

4. A device for dressing grinding wheels comprising a body including two arm portions spaced from each other, and a spool and shaft supported between and rotatable in respect to said arm portions, a series of spaced toothed disks concentric with the spool and rigid therewith, there being a clearance between the ends of the spool and the adjacent faces of the arms of the body considerably greater than the width of a single disk whereby the spool is allowed free movement longitudinally of its own axis within the limits of said clearance.

5. A device for dressing grinding wheels or the like, comprising a body including two arm portions having alined bearings, a shaft rotatable in said bearings, a spool rigid with the shaft between the arm portions, a series of spaced toothed disks rigid on the spool, dust caps for the bearings on the outer surfaces of the arms, the spool being of a length considerably less than the distance between the arms and the shaft being of a length considerably less than the distance between the dust caps, both shaft and spool being freely shiftable along their common axis by the rotative engagement of the disks with a wheel upon which they may be working.

JOHN E. HOY.

Copies of this patent may be obtained for five cents each, by addressing the "Commissioner of Patents, Washington, D. C."